Oct. 9, 1956            T. L. SLATER            2,766,401
ARTIFICIAL HORIZON INDICATOR
Filed Sept. 4, 1952
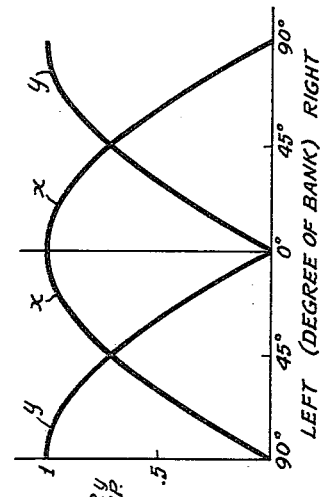
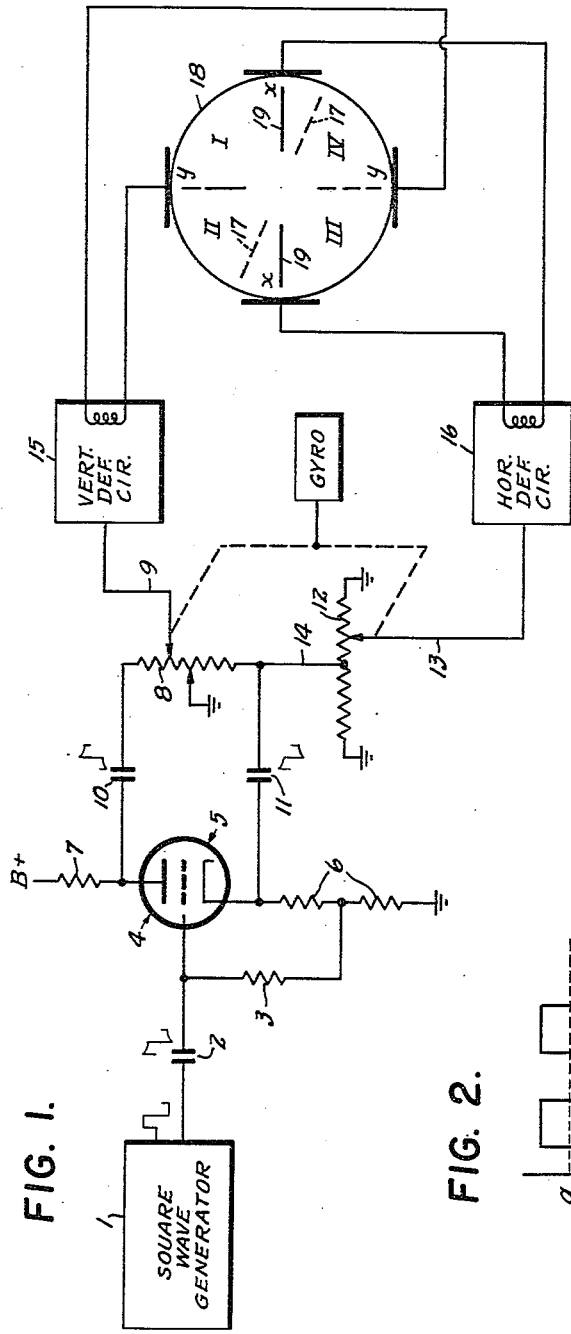
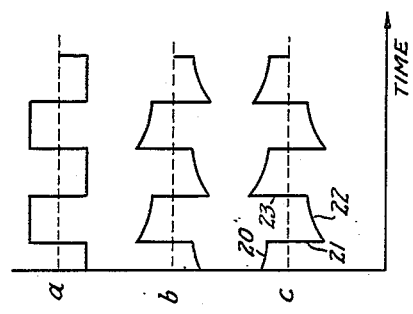
INVENTOR.
T. L. SLATER
BY R. P. Morris
ATTORNEY United States Patent Office 2,766,401
Patented Oct. 9, 1956

2,766,401

ARTIFICIAL HORIZON INDICATOR

Thurman L. Slater, Fort Wayne, Ind., assignor to International Telephone and Telegraph Corporation, a corporation of Maryland Application September 4, 1952, Serial No. 307,934

4 Claims. (Cl. 315—24)

This invention relates to artificial horizon indicator systems, and particularly to such systems used on aircraft.

Generally, horizon indicator systems comprise an indicator and means for producing on the indicator a line, or pair of lines, indicating the relationship between the true horizon, or horizontal, and the attitude of the craft. Thus when a pilot is in the clouds he is able to keep the craft on an even keel even though the earth and sky are obscured. The indicator in its simplest form may comprise a bar, held in horizontal position by gyroscopic stabilizers. Alternatively a cathode ray tube indicator may be used in which the deflection potentials of a linear trace are controlled so as to keep the trace horizontal despite banking of the aircraft.

Generally these latter devices may comprise relatively complicated circuits for adjusting and controlling the sweep trace circuits. Often there is provided on the face of the indicator a replica of the front view of an aircraft so that the altitude of the craft relative to the horizon is readily apparent. With such constructions the center part of the trace may not be visible so this portion may be eliminated without detriment to the indicator use. Moreover, it is sometimes desired to provide other indications on the same oscilloscope, which may be made in the center part by alternate switching of control circuits.

It is an object of this invention to provide a simple and novel means for producing and controlling an indication of the artificial horizon on the cathode ray indicator.

It is a further object of this invention to provide means for producing a split strobe on the cathode ray indicator, without the use of blanking means.

It is another object of this invention to provide a simple deflection control circuit, which provides a voltage for deflecting the trace of the cathode ray indicator in accordance with the lateral angular displacement of the aircraft.

In accordance with an aspect of the invention, there is provided a system for indicating an angular displacement of a moving craft relative to a datum plane, comprising means for generating a pair of voltage waves having phase opposed relationship. These voltage waves are applied to a deflection control circuit having outputs coupled to two pairs of deflecting electrodes, respectively, of a cathode ray indicator. The control circuit produces at its outputs, waves having a voltage ratio determined by the angular displacement of said craft, whereby the cathode ray indicator traces will be inclined at an angle with respect to the beam axis of the craft proportional to said ratio.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a schematic diagram of the artificial horizon indicator system forming an embodiment of the invention;

Figs. 2 and 3 are graphical representations of operating voltage wave forms used in explaining the operation of the system of Fig. 1.

Referring first to Fig. 1, there is shown schematically an artificial horizon indicating system preferably for use in aircraft. The system comprises a square wave generator 1, which may be a multivibrator, or other known type of square wave generator. The voltage wave, Fig. 2a, from the square wave generator 1 is shaped, as shown by Fig. 2b, by a differentiating circuit comprising a capacitor 2 and resistor 3. The differentiated wave is applied to the inverter circuit 4, which comprises an inverter tube 5 suitably biased by cathode resistors 6. Plate supply voltage is applied to the anode of tube 5 over resistor 7 from the plate supply voltage source (B+).

A first potentiometer circuit comprising a resistor 8 and a variable arm 9 is coupled across the inverter tube 5. Coupling capacitors 10 and 11 are provided in the anode and cathode circuits respectively, of the tube 5, to supply the voltage waves at the proper A. C. reference potential. The resistor 8 is center-tapped to ground so that the sense of the wave appearing on one side of center-tap is opposite to the sense of the wave appearing on the other side. The voltage wave forms appearing across the capacitors 10 and 11 are phase opposed as shown by curves b and c, respectively, of Fig. 2 since they are derived from cathode resistor 6 and anode resistor 7, respectively. A second potentiometer circuit comprising resistor 12 and variable arm 13, is coupled by a center-tap 14 from resistor 12 to one terminal of resistor 8 of the first potentiometer circuit. The resistor 12 has its opposite terminals connected to ground.

The variable arms 9 and 13 respectively, are mechanically coupled together and are controlled by a gyromechanism (shown by block diagram). The gyromechanism is responsive to the lateral angular displacement of the craft and is oriented to actuate the variable arms accordingly. Variable arms 9 and 13 are coupled electrically to vertical and horizontal deflection circuits 15, 16 respectively, for controlling the deflection of a trace 17 of a cathode ray indicator 18. Therefore, the deflection of the trace 17 is a function of the ratio of the voltages on arms 9 and 13, respectively.

The variable arms are so connected with the gimbals of the gyro that when the aircraft is flying on even keel, with no roll, the arms 9 and 13 will be aligned with the center taps. Therefore, there will be produced on the indicator 18 a trace 19 having no "Y" component. Since arm 9 is then opposite the grounded center tap the vertical deflection circuit is coupled to ground over arm 9, and the trace 19 is produced only by the wave appearing across capacitor 11. This is shown clearly in Fig. 3, which illustrates the relative magnitudes of the voltages applied to the deflection circuits. If the craft banks to the right, arm 9 will be moved upwardly and arm 13 will be moved to the right. Therefore, the trace is rotated clockwise, as shown by the dotted line. The X and Y deflection voltages are always in phase or in phase plus 180° and are variable by arms 9 and 13 only in amplitude. The "Y" component is negative in the IV quadrant because the wave applied to the vertical deflection circuit during the same period of time is negative; and the converse is true of the trace and wave in the II quadrant. Referring to Fig. 3, it is seen that if the degree of bank is slightly to the right the X component will predominate. In the extreme condition, when the craft is banking 90° to the right, then the arm 9 will be aligned with the upper terminal of resistor 8, and the arm 13 will be coupled to ground via the right hand terminal of the resistor 12. In this case the trace would consist of only the "Y" component.

When the craft banks to the left, the arm 9 is moved below the tap to ground, and arm 13 is moved to the left of tap 14. The voltage wave appearing across capacitor 11 (Fig. 2c) is therefore applied to both arms 9 and 13, respectively; the ratio being determined by the voltage drop across the respective resistors 8 and 12. In this case a deflected trace, opposite in sense to the one shown in dotted lines, would be produced on the indicator.

The split strobe, as shown in Fig. 1, is produced by the voltage wave forms which are applied to the respective deflecting circuits. The wave applied to the horizontal deflection circuit, shown by Fig. 2c, consists of a curved portion 20 which deflects the beam from the right hand position to short of the zero center position. The beam will then follow a deflection path to the left hand position of the screen at a very rapid rate under influence of the wave portion 21 of curve c. The beam will then trace a line from the left hand position toward, but short of the center under influence of wave portion 22 and return rapidly to the right hand side under influence of the wave portion 23, whereafter the original cycle will again be repeated. Therefore, a trace consisting of two lines is produced on the indicator. The sweeping portions 20, 22 of the wave are so formed as not to reach the zero axis, thus producing a gap between the tracing lines. Because of the very rapid movement during the time indicated by parts 21 and 23 of the curve, the trace will be only slightly visible, if at all across the gap. However if desired, a blanking signal may be applied to the cathode ray tube grid during this interval.

The voltage represented by curve b tends to produce a similar deflection in a vertical line. As a consequence, the resultant of these forces produces a linear trace having an angle with respect to the X—Y axis dependent upon the relative amplitude of the applied waves.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. A system for indicating the angular displacement of a moving shaft comprising square wave generating means; differentiating means coupled to said square wave generator to partially differentiate said square wave, the time constant of said differentiating means being such as to produce a straight-sided voltage loop with a sloping top; inverter means coupled to said differentiating means including a grid-controlled electron discharge tube having a cathode, an anode, and load resistors in the anode and cathode circuits thereof so that when said partially differentiated wave is applied to said grid, the waves produced at said anode and cathode terminals of the tube are phase-opposed with oppositely sloped tops; a first resistor connected at one end to said anode and being center-tapped to ground and having a variable contact arm; a second resistor having a variable contactor arm and a center-tap coupled to the other end of said first resistor; means mechanically coupling said variable arms together and to said shaft to produce given ratios of output voltages at said variable arms, so that said ratios are proportional to said angular displacement, a cathode ray indicator means having two pairs of deflecting electrodes; and means coupling said variable arms to said pairs of deflecting electrodes, respectively.

2. A system for indicating the displacement of a shaft comprising a cathode ray tube with two orthogonal ray-deflecting means, means for generating a square wave, a phase inverter responsive to the square wave generator for producing two phase-opposed square waves with oppositely directed lobes, said lobes having substantially vertical leading and trailing edges, differentiating means coupling the square-wave generator and phase inverter for producing opposed sloped tops on each straight-sided lobe, and means for applying voltages analogous to the two phase-opposed sloped-top voltages, respectively, to the ray-deflecting means so that said voltages sweep the cathode ray of said tube at a relatively slow rate and then at a more rapid rate in one direction, and then sweeping said ray at a relatively slow rate and then at a more rapid rate in the opposite direction.

3. A system for indicating the angular displacement of a shaft comprising a cathode ray tube with horizontal and vertical deflection means, means for generating a square wave, one cycle of said wave including oppositely directed rectangular lobes having substantially vertical leading and trailing edges, a phase inverter with two outputs for phase-opposed signals coupled to the output of the square wave generator, a differentiating coupling circuit between said generator and inverter of such parameters that the top portions only of said lobes have measurable finite and opposite slopes, and means coupled to said two outputs applying voltages analogous to said lobes, respectively, to said horizontal and vertical deflection means so that the lobe voltages sweep the cathode ray at a relatively slow rate and then at a more rapid rate in one direction, and secondly to sweep said ray at a relatively slow rate and then at a more rapid rate in the other direction, and means for varying the amplitude of the lobe voltages in accordance with shaft displacement.

4. A system for indicating the displacement of a moving shaft comprising a cathode ray tube with two deflecting circuits, means for generating a square wave having substantially vertical leading and trailing edges, a differentiating circuit coupled to the output of said generating means, the time constant of said differentiating circuit being predetermined and sufficient to slope the top only of the straight-sided square waves, a phase inverter operably coupled to said differentiating means with two outputs for providing two waves in phase opposition with oppositely sloped tops; a signal distribution system for coupling said phase-opposed waves, respectively, to the two deflecting circuits of said cathode ray tube, said signal distribution system having a first potentiometer connected at opposite ends to said two outputs and having a sliding contact to select either of said phase-opposed waves and a second potentiometer with a sliding contact and with a center point connected to one of said two outputs and operable to select only one of said phase-opposed waves, said first and second contacts being coupled, respectively, to said two deflecting circuits of said cathode ray tube, so that each of said phase-opposed waves serves to provide a sweep trace on said tube which is apparently interrupted intermediate the trace ends.

References Cited in the file of this patent

UNITED STATES PATENTS

| | | |
|---|---|---|
| 2,384,484 | Norden et al. | Sept. 11, 1945 |
| 2,406,858 | Shepherd | Sept. 3, 1946 |
| 2,411,030 | De Ryder | Nov. 12, 1946 |
| 2,416,200 | Nagel | Feb. 18, 1947 |
| 2,474,177 | Wild | June 21, 1949 |